(12) United States Patent
Peeters

(10) Patent No.: US 7,356,305 B2
(45) Date of Patent: Apr. 8, 2008

(54) VEHICLE ENABLED NETWORKS

(75) Inventor: Eric Peeters, Fremont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 587 days.

(21) Appl. No.: 10/741,980

(22) Filed: Dec. 19, 2003

(65) Prior Publication Data
US 2005/0148334 A1    Jul. 7, 2005

(51) Int. Cl.
    *H04B 7/185* (2006.01)
(52) U.S. Cl. .................. 455/12.1; 455/436
(58) Field of Classification Search .......... 455/41.1, 455/41.2, 442, 569.1, 69, 522, 415, 411, 421, 455/432, 7, 11.1, 13.1, 552.1, 569.2, 453, 455/452, 571, 572, 423, 436–439, 33.2, 99, 455/152.1, 345, 9, 15–16; 370/338, 226, 370/243, 246, 311, 331, 315, 492, 501
See application file for complete search history.

(56) References Cited

U.S. PATENT DOCUMENTS

| 6,697,638 | B1* | 2/2004 | Larsson et al. .......... 455/553.1 |
| 2002/0187746 | A1 | 12/2002 | Cheng et al. |
| 2003/0129982 | A1* | 7/2003 | Perini .......................... 455/442 |
| 2003/0143987 | A1* | 7/2003 | Davis et al. ................ 455/417 |
| 2004/0117442 | A1* | 6/2004 | Thielen ....................... 709/203 |
| 2005/0048977 | A1* | 3/2005 | Dorenbosch et al. ....... 455/441 |
| 2005/0070326 | A1* | 3/2005 | Morton .................... 455/552.1 |

FOREIGN PATENT DOCUMENTS

| WO | WO 0147181 | 6/2001 |
| WO | WO 0213415 | 2/2002 |
| WO | WO 03021817 | 3/2003 |
| WO | WO 03101130 | 12/2003 |

OTHER PUBLICATIONS

Yap, Jung Houn, Ghaheri-Niri, Shahram, and Tafazolli, Rahim: Position Assisted Relaying and Handover In Hybrid Ad Hoc WCDMA Cellular System, 2002 IEEE, pp. 2194-2198.

\* cited by examiner

*Primary Examiner*—Tu Nguyen
(74) *Attorney, Agent, or Firm*—Park, Vaughan & Fleming LLP

(57) ABSTRACT

A method and apparatus for improving a network is described. The network uses the energy from a vehicle battery or vehicle generator to power an intermediate transmitter device that receives the signal from a portable wireless device and retransmits the information in the signal to a base station. The intermediate transmitter device also receives information from the base station and retransmits the information to the portable wireless device. The described system expands the areas in which a wireless device may be used.

22 Claims, 5 Drawing Sheets

VEHICLE ENABLED NETWORKS

BACKGROUND

Wireless communication networks have become an important part of the lives of many people. Cellular phones and wireless laptop computers and PDAs have become ubiquitous. However, the range of such system is limited by the placement of receivers. For example, with respect to cellular networks, it may be difficult to locate enough cellular base stations to avoid "dead spots" due to many high rise buildings in densely populated areas such as New York City. In sparsely populated areas, base stations may be spread too far apart to provide adequate coverage.

Other forms of wireless communications may be used for high speed Internet communications also have disadvantages. In particular, WiFi systems typically depend on limited shorter range signals. Such WiFi systems may be used for local "hot spots", however the area of the local hot spots is typically a few hundred meters rather than several miles. Thus portable electronics that communicate using WiFi systems typically have large areas in which they are inoperative.

Thus a system to improve the coverage of such networks is needed.

SUMMARY

A method of facilitating two way wireless communication is described. A mobile wireless repeater unit for use in a vehicle receives a signal from a mobile device. The mobile wireless repeater unit determines whether the received signal is in a group of signals authorized for retransmission. When the signal is in a group authorized for retransmission, the signal is retransmitted to a base station. A response or reply signal is then received from the base station and forwarded to the mobile device.

DETAILED DESCRIPTION

A network that uses the batteries and generators in vehicles as a power source to act as an intermediate transmission device in a network for carrying voice and/or data is described. In particular, the automobile includes an intermediate transmission device that receives information from a mobile device, typically using a shorter range signal. The information may be converted into a long range signal that is retransmitted by the vehicle. Replies are received by the vehicle and retransmitted to the mobile device.

Figure 1:
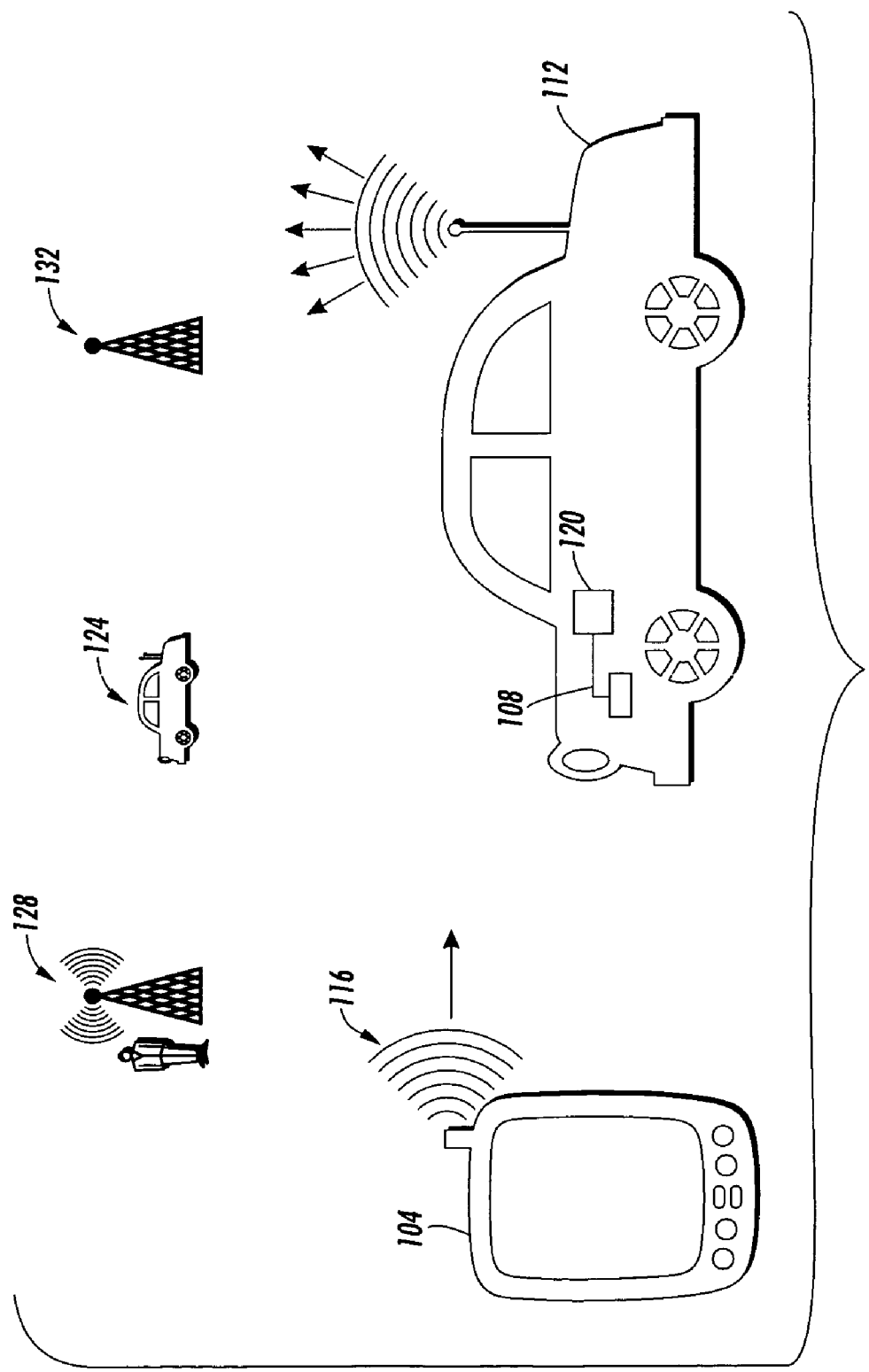
FIG. 1 shows a network including an automobile that serves as an intermediate transmission device.

FIG. 1 shows a network that includes a mobile device 104 in communication with an intermediate transmission device 108 in an automobile 112. Mobile device 104 may be a cellular telephone, a personal organizer such as a PDA, or any other device that may benefit from Internet or long distance communication. The transmission signal 116 is typically an electromagnetic signal, such as a radio wave using a predefined protocol. Often transmission signal 116 is a shorter range signal with a range of less than 2 miles, or even more often, less than 1 mile, using a protocol such as WiFi or bluetooth. The signal may be shorter range due to physics limitations, or the signal may be shorter range due to governmental restrictions such as FCC regulations. However, transmission signal 116 may also be a longer range signal, such as cellular signals using Code division multiplexing (CDMA) and Global System for Mobile Communications (GSM). The distance between the automobile 112 and the mobile device 104 is typically limited by the protocol being used. For example, when WiFi is being used, the area of the "hot spot" generated is typically several hundred feet.

When intermediate transmission device 108 receives signal 116, a processor 120 determines whether the mobile device is part of an authorized network. The authorization may be based on whether the user is a subscriber to a particular brand or company such as Cingular, Verizon or AT&T. The authorization may also be based on whether the subscriber has paid bills. In pay as you go systems, the processor may process a payment from a user. The processor may receive a numeric identifier that corresponds to a payment method. Example of numeric identifiers include, but are not limited to, checking account numbers and credit card numbers. When processor 120 identifies the user as an authorized user, the transmission device 108 may boost the signal strength and retransmit the signal to a receiving element in the network. Alternately, the intermediate transmission device 108 may change the format of the signal from a shorter range signal to a longer range signal and retransmit the signal. The receiving element may be another vehicle 124, a local hotspot 128 or a base station 132. Typically base station 132 is a cellular base station, although base station 132 may be any principle destination point for the signal, including an orbiting satellite.

Figure 2:
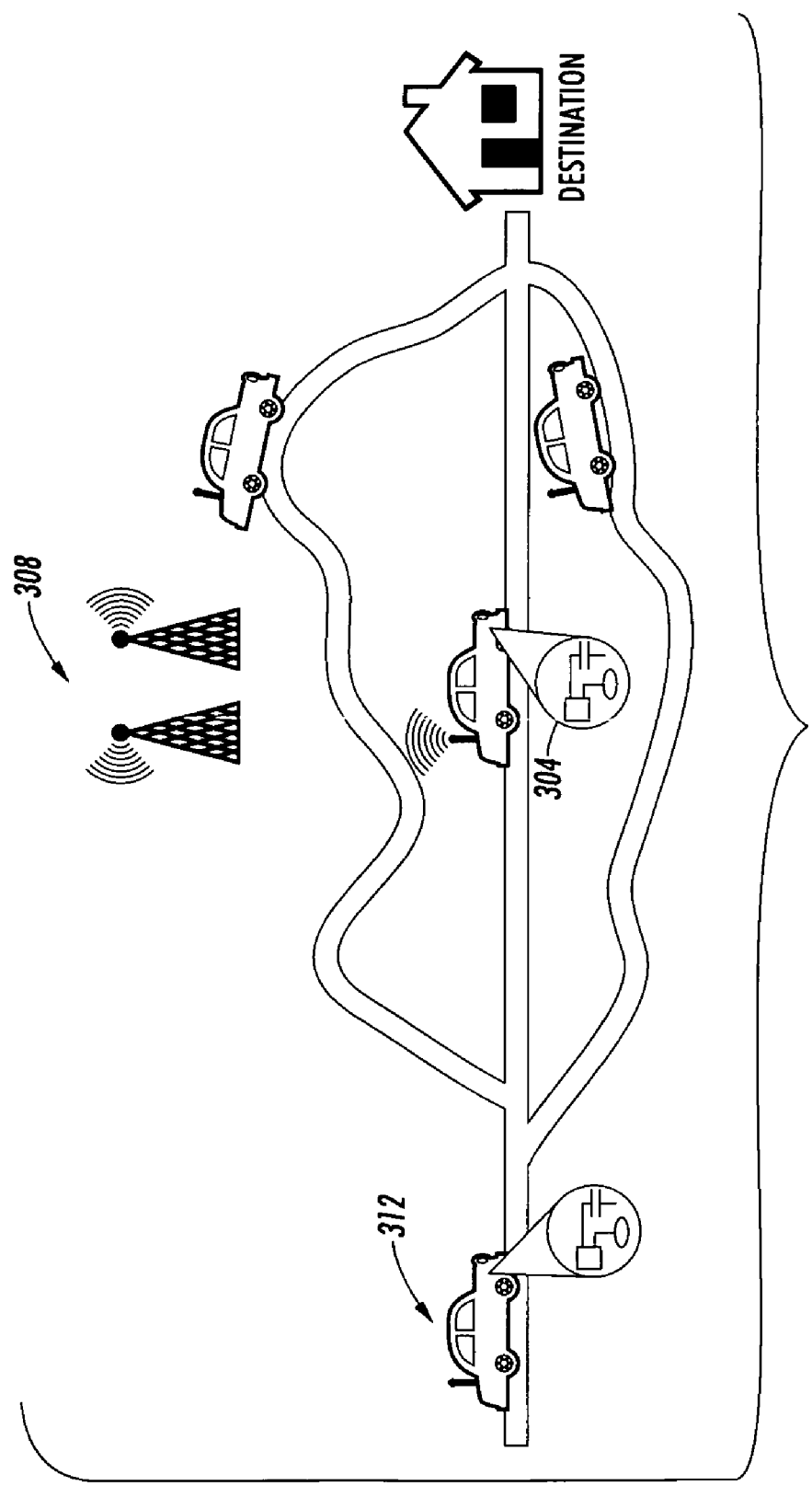
FIG. 2 shows intermediate transmission device integrated into an automobile.

FIG. 2 shows the integration of an intermediate transmission device 204 into an automobile 208. Intermediate transmission device 204 receives power from a power source 212. Power source 212 may include an automobile battery 216 or an automobile generator 220. Battery 216 is typically a 12 volt battery, often a lead acid battery although other power storage device may be used. Typically, the system should be operable when the engine of the automobile 208 is off and the automobile stationary. Intermediate transmission device 204 consumes relatively low levels of power and can operate for extended periods without significantly draining the automobile battery 216. However, to prevent overdraining the battery, a power monitoring system 224 coupled to battery 216 monitors battery levels.

Power monitoring system 224 prevents excessive drain on the battery by controlling the drain rate. One way of controlling the drain rate is by keeping the load, the number of mobile devices coupled to intermediate transmission device 204, low enough to prevent overload. When Power monitoring system 224 detects the stored power level has dropped below a predetermined value, the power monitoring system may deny access to all mobile devices except for the owner of the intermediate transmission device. When Power monitoring system detects the power level has dropped below a predetermined critical value, the power monitoring system 224 shuts the intermediate transmission device 204 off completely except for low level monitoring of emergency transmissions.

One use of the intermediate transmission device is to provide a continuous WiFi hotspot around the vehicle enabling the vehicle owner to continue to surf the Internet from the vicinity of the parked car. However, to increase the number of such intermediate transmission devices available to non-owners of the vehicle, incentives may be provided to encourage use by general wireless customers, or agreements may be used to allow the general public to use the intermediate transmission device in exchange for commensurate advantage to the owner of the intermediate transmission device. That commensurate advantage may include, but is not limited to, discount on the owner's cellular rates, or payments made by actual users of the intermediate transmission device.

Integrating the intermediate transmission device with automobile systems that include telecommunications capabilities minimizes costs. Automotive systems with telecommunications capabilities may include, but are not limited to entertainment systems such as stereos that receive and decode radio signals, and some navigation systems that interact with base stations providing real time traffic updates.

Figure 3:
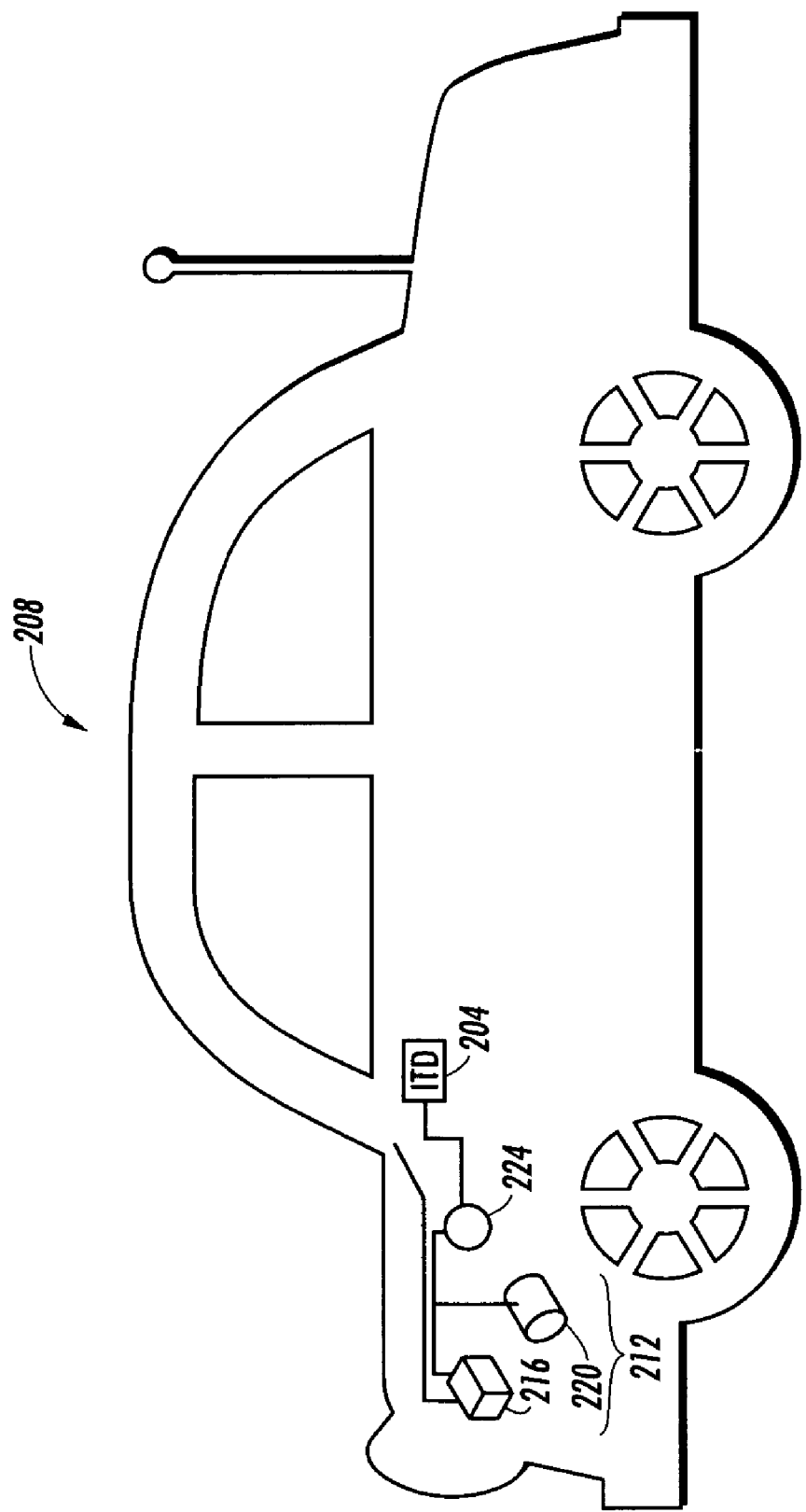
FIG. 3 shows the use of the navigation unit to communicate traffic information.

FIG. 3 shows example integration with a navigation system. In FIG. 3, the navigation system 304 includes an identifier automobile that transmits information on identifier automobile speed and position to a central station 308. Central station 308 forwards the information to a receiving vehicle 312. A navigation system in receiving vehicle 312 plots several routes between the current position in receiving vehicle 312 and a desired destination. The real time traffic information forwarded by central station 308 is integrated into the several routes to determine a fastest route. The navigation system presents the fastest route to the driver. Such a navigation system is described in U.S. patent application Ser. No. 10/734,428 entitled "Traffic Flow Data Collection Agents" by Eric Peeters filed on Dec. 12, 2003, and assigned to the same assignee, and hereby incorporated by reference in its entirety.

In one embodiment, each navigation system in each vehicle can serve both as a receiving system in a receiving vehicle and a transmitting system in an informing vehicle. Thus, each navigation system includes the electronics needed to transmit information to central station 308 as well as receive signals from central station 308. Because the navigation system already includes the necessary transmission and receiving electronics electronics, adding intermediate transmission electronics into the navigation system allows sharing of electronic components thereby reducing costs. In addition, the description accompanying FIG. 5 explains the possible network use of the navigation system generated GPS information.

In an alternate embodiment, the intermediate transmission electronics may be integrated into an entertainment system. The entertainment system typically includes electronics for receiving a radio signal. The entertainment system electronics may be modified to also receive signals from mobile electronic devices and to establish two way communications between the mobile device and a base station.

Figure 4:
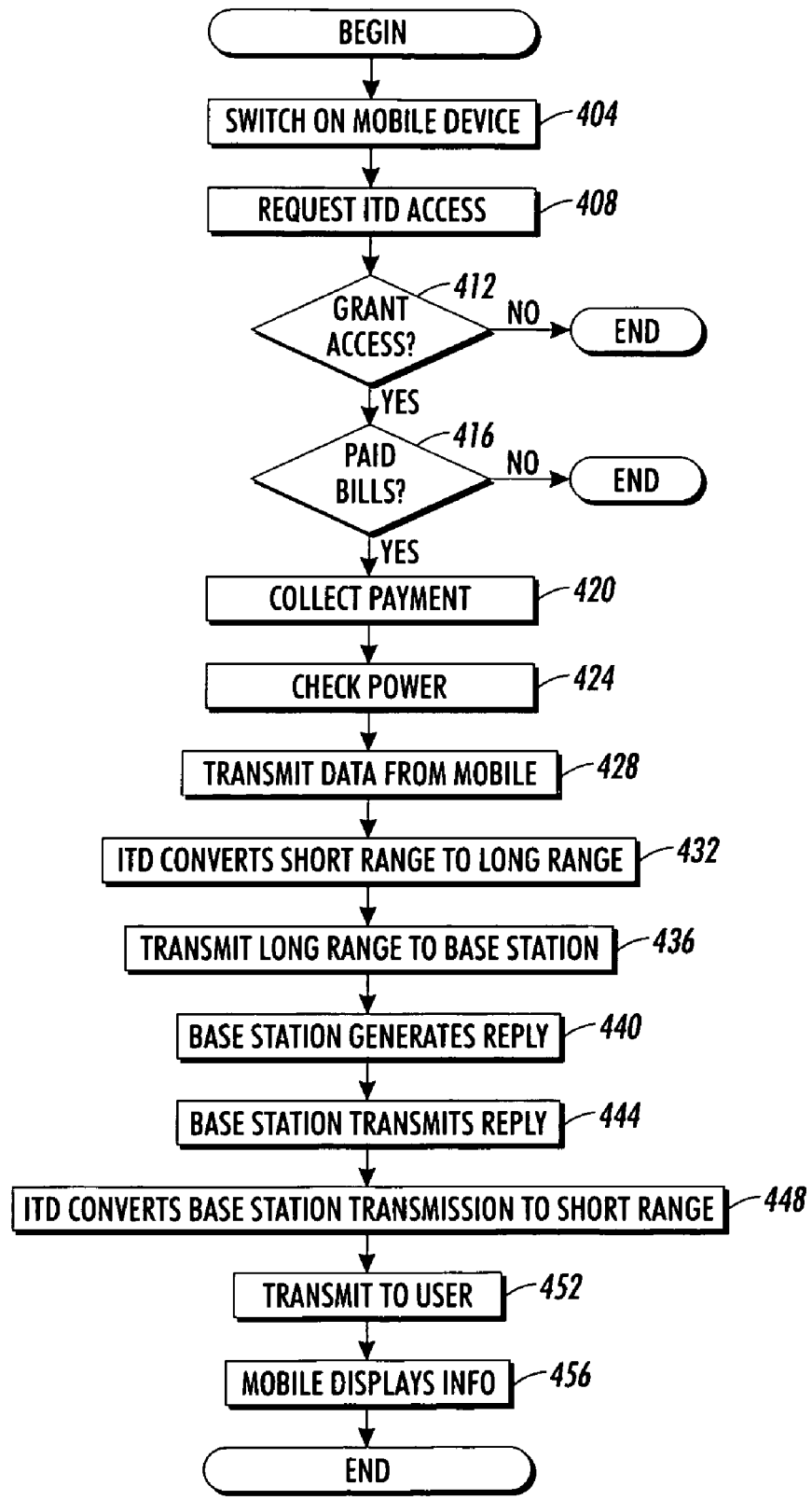
FIG. 4 shows a flow chart that describes operation of the network.

FIG. 4 shows a flow chart that describes operation of one embodiment of the network. In block 404, a mobile device is switched on and searches for a local connection. The connection is typically a shorter range connection such as a WiFi connection or a Blue Tooth connection, although longer range signal types such as a CDMA or GSM connection may also be accepted. Upon detection of the intermediate transmission device (hereinafter ITD) the mobile device requests access in block 408.

The ITD determines whether to grant access in block 408. Determination of whether to grant access may include determination of appropriate protocols and authorization information (which may be based on wireless carrier brands such as AT&T, Verizon, etc) in block 412. If the mobile device has the appropriate authorization data, the intermediate transmission device may perform further checks such as whether the mobile device has had its wireless access bills properly paid in block 416. If the bills have not been paid, the intermediate transmission device may collect credit card or other billing information to bill the mobile user for the connection in block 420. In one embodiment, the automobile owner may receive usage credit or some compensation for the use of the ITD.

If account information is cleared, the ITD also checks its own power levels in block 424. The access levels may be set to different levels depending on the amount of power available in the battery. For example, if the battery is 80 percent charged or greater, all authorized users may use the ITD. If the battery is between 60 and 80 percent charged, only users that compensate the ITD owner with a credit or fee will be granted use of the ITD. If the battery is between 40 and 60 percent charged only the owner will be authorized to use the ITD. Signals may also be provided to enable emergency override of the power protection feature to allow emergency vehicles and 911 access even when power levels are low.

Assuming that the user is authorized to use the ITD and the ITD has sufficient power, access is granted and the user transmits a stream of data to the ITD in block 428. In one embodiment, the ITD simply repeats the data with more power to another ITD or to a base station. Base station is broadly defined to include cellular base stations, satellites and the like. More often, the ITD converts the format of the data from a short range transmission format to a longer range transmission format as shown in block 432. For example, if the mobile device uses WiFi to couple to the ITD, the ITD converts the html in the WiFi signal to a different format, such as a CDMA signal for longer distance transmission.

In block 436, the ITD transmits the data, typically in a longer range signal, to a land based central receiving station. If a central receiving station is not within range, the signal may be transmitted directly to satellites or to a second in range ITD. The second ITD may repeat the process until the longer range signal reaches a base station that includes an Internet or other telecommunication system access point.

After the base station receives the signal, the access point receives or generates a reply signal in block 440. The reply signal may include html code in response to a URL request, a reply in a telephone conversation, or some other response that is expected in a two way communication. The reply signal is transmitted to the ITD in block 444.

In block 448, the ITD converts the data from the base station to a protocol acceptable to the mobile device. In block 452, the mobile device receives and communicates the received information to the user. The information may be communicated to the user using audio signals or on a display. As long as continued communication is needed, the process repeats in block 456.

Figure 5:
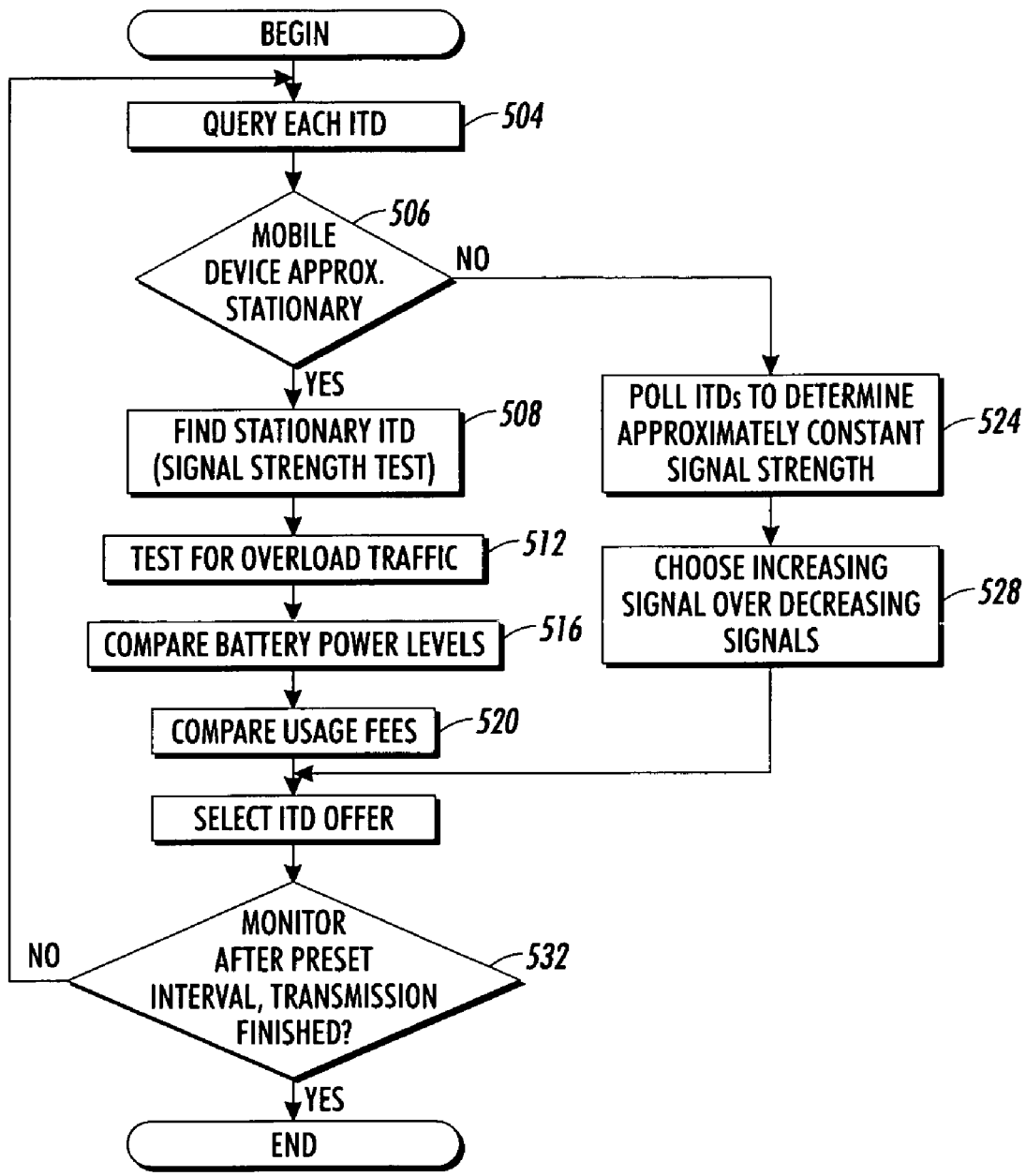
FIG. 5 shows a flow chart that describes selecting an intermediate transmission device.

In actual systems, particularly in densely populated areas, many ITD may be available to each mobile device. Thus, each mobile device selects a particular ITD from a plurality of ITDs. A selection process for selecting an ITD should take into account a number of parameters. FIG. 5 shows a flow chart that describes one method of selecting an ITD.

In block 504 of FIG. 5, the mobile device queries each ITD starting from the one with the strongest signal to one ranging downwards to one with a signal strength just barely above a minimum threshold. Starting with the strongest signal, the ITD determines whether an ITD is in motion or stationary. When, in block 506, it is determined the mobile device is approximately stationary (not traveling in a vehicle, for purposes herein, approximately stationary means traveling at less than 9 miles per hour, a speed at which most people cannot maintain a sustained run), stationary ITDs are preferred. Stationary ITDs are usually parked cars. If the mobile device is approximately stationary, a stationary ITDs usually provides a more stable signal because the relative distance between the ITD and the mobile device changes only slowly. One method of determining whether a vehicle is stationary is that the signal strength between the ITD and a base station is constant. In an alternate embodiment, the mobile device may determine that the signal strength between the ITD and the mobile device does not change more than is caused by the motion of the mobile device itself. The rate of change in signal strength is measured in block 508. Maintaining an approximately constant signal strength helps avoid very brief connection times that result from rapidly moving out of range of shorter range signals.

If several stationary ITDs are available, the mobile device may poll the ITDs on other users currently connected via each ITD in block 512. ITDs that are being less used are preferred because they may offer more bandwidth enabling faster transmission speeds. In block 516, power level information of the battery powering each ITD may be obtained. Low power levels in the battery supplying power to the ITD means that the ITD may soon reach critical levels, warn, and eventually disconnect the mobile device.

In some embodiments, the mobile device compares ITD usage fees as shown in block 520. When ITDs are not part of an accepted network where costs are fixed, ITD owners may require payments for ITD use. Thus, the mobile device may factor cost into ITD selection. This may be particularly relevant when some mobile owners want to avoid "commercial hot spot vehicles" that remain profitable by providing a traveling hot spot in critical areas.

When in block 506, it is determined that the mobile device is in a moving vehicle, an ITD in a moving vehicle that is traveling in the same direction at approximately the same speed offers the maximum connection time. Ideally, the mobile device and the ITD travel in the same vehicle. However, when such an ITD is unavailable, minimizing the rate of change in distance between the ITD and the mobile device becomes more important than choosing a stationary ITD.

One method of determining whether the vehicles are traveling in the same direction is for the mobile device to poll the ITD after a short time interval as shown in block 524. If the ITD signal strength remains relatively constant, the rate of change in distance between the ITD and the mobile device changes only slowly. Slowly changing signal strength ITDs are favored over ITDs where the signal strength changes rapidly. If an ITD with slowly changing signal strength is unavailable, then ITDs where the signal strength is increasing are favored over ITDs where the signal strengths are decreasing in block 528. An increasing signal strength indicates the vehicles are coming toward each other, whereas a decreasing signal strength may offer only a brief connection.

An alternate method of determining whether the ITD is traveling toward the mobile device is to have the navigation system in the ITD transmit to the mobile device GPS coordinates and a vector including the approximate speed and direction of the ITD. Such information is readily available when the ITD is integrated into the navigation system. In the embodiment described in U.S. patent application Ser. No. 10/734,428 entitled "Traffic Flow Data Collection Agents" which has been incorporated by reference, the speed of the vehicle may be computed from the speedometer or from the changing of GPS coordinates over time. In extremely sophisticated systems, the navigation system of the ITD vehicle may provide final destination information of the vehicle carrying the ITD. The mobile device may use the speed and direction information and in some cases the final destination information, and compare the information with its own speed and direction to select the ITD that will offer the longest "in range" connection time.

Regardless of the ITD selected, because the ITDs are in vehicles and thus capable of motion, the system should handoff or transfer connections to other ITDs once signal strength drop below critical minimum values. Thus the mobile device continuously monitors signal strength in block 532. When the signal strength drops below a minimum threshold, the mobile device repeats the procedures designated in FIG. 5 to find another ITD.

ITDs typically have sufficient signal strength to directly communicate with a main base station, or even directly with a satellite. However, sometimes obstruction blocks the signal. Alternately, the type of communication used may not enable extremely long ranges. This may be due to regulations such as FCC rules limiting the transmission power or because the signal type used is unsuitable for extremely long transmission. In such cases, the ITD may "hand off transmission" of the signal to another "hop". A hop being another ITD that forwards signals between the first ITD and the base station. Many of the same criteria used by the mobile device in selecting a first ITD are used by the first ITD in selecting a second or hop ITD including relatively changing signal strength. There may be several hops between the first ITD and the base station.

When the communication system is incapable of connecting the first direct ITD directly with the base station and requires the use of hops, the distance between the base station and the ITD also becomes important. Thus, in such embodiments, the mobile device may also query the ITD on the strength of its connection to the base station and favor ITDs in which the signal strength with the base station is not rapidly changing.

Because ITDs may be in motion, the ITD used may begin to lose contact with the base station. In situations where the ITD begins to lose contact with the base station, typically determined when the signal strength of the base station at the ITD falls below a preset threshold, communication between the mobile device and the base station may be handed off or otherwise transferred to a second ITD with a stronger base station connection.

The specification presented above is provided to facilitate understanding of the invention. As such, the specification includes many details, which are provided to improve understanding but are not necessary to practice the invention. For example, standard communication protocols may change, and the invention should not be limited to he protocols recited herein. Thus the invention should not be limited by the specification, but only by the claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of facilitating two way communications between a mobile device and a base station comprising:
   receiving from the mobile device a shorter range wireless signal at a first intermediate transmission device in a vehicle;
   determining whether the wireless signal is in a group of signals authorized for retransmission;
   retransmitting signals authorized for retransmission to a base station using a longer range signal;
   receiving reply signals from the base station;
   forwarding the received reply signals to the mobile device;
   detecting the presence of a second intermediate transmission device, the second intermediate transmission device also in a vehicle and also authorized to retransmit the longer range signal from the first intermediate transmission device; and,
   handing off the repeating of the longer range signal from the first intermediate transmission device to the second intermediate transmission device when a signal strength from the mobile device at the first intermediate transmission device falls below a preset threshold,
   wherein the mobile device selects the intermediate transmission device by determining the relative motion between the mobile device and the intermediate transmission device.

2. A method of facilitating two way communications between a mobile device and a base station comprising:
   receiving from the mobile device a shorter range wireless signal at a first intermediate transmission device in a vehicle;
   determining whether the wireless signal is in a group of signals authorized for retransmission;
   retransmitting signals authorized for retransmission to a base station using a longer range signal;
   receiving reply signals from the base station;
   forwarding the received reply signals to the mobile device;
   detecting the presence of a second intermediate transmission device, the second intermediate transmission device also in a vehicle and also authorized to retransmit the longer range signal from the first intermediate transmission device; and,
   handing off the repeating of the mobile device signal from the first intermediate transmission device to the second intermediate transmission device when the received reply signals from the cellular base station at the first intermediate transmission device falls below a preset threshold,
   wherein the mobile device selects the intermediate transmission device by determining the relative motion between the mobile device and the intermediate transmission device.

3. The method of claim 1 wherein the second intermediate transmission device also receives reply signals from the base station; and,
   forwards the received signals to the mobile device.

4. The method of claim 1 wherein two measurements of signal strength spaced by a time interval are used to determine relative motion, a fairly constant signal strength indicating similar motion.

5. The method of claim 1 wherein vehicle is moving.

6. The method of claim 1 wherein the shorter range signal is a WiFi signal.

7. The method of claim 1 wherein the longer range signal is a cellular signal.

8. The method of claim 7 wherein the cellular signal is a GSM signal.

9. The method of claim 1 wherein the shorter range signal is a BLUETOOTH® signal.

10. The method of claim 7 wherein the longer range signal is a CDMA signal.

11. The method of claim 1 wherein the determination of authorization for retransmission involves the operation of determining if the signal corresponds to a particular cellular network.

12. The method of claim 1 wherein the determination of authorization for transmission involves determining whether a cellular account is active.

13. The method of claim 1 further comprising:
    determining whether the cellular base station is close to capacity in handling signals;
    when the base station is close to capacity, forwarding the signal to a second repeater unit for forwarding to a second base station when the base station is close to capacity.

14. The method of claim 1 wherein the first intermediate transmission device receives power from an automobile battery, the first intermediate transmission device deciding whether to authorize transmission of a signal based on the amount of power in the automobile battery.

15. A method of facilitating two way communications between a mobile device and a base station comprising:
    receiving from the mobile device a shorter range wireless signal at a first intermediate transmission device in a vehicle wherein the first intermediate transmission device receives power from an automobile battery, the first intermediate transmission device deciding whether to authorize transmission of a signal based on the amount of power in the automobile battery, wherein at lower power levels, the owner of the intermediate transmission device is given priority over other user requests to use the intermediate transmission device;
    determining whether the wireless signal is in a group of signals authorized for retransmission;
    retransmitting signals authorized for retransmission to a base station using a longer range signal;
    receiving reply signals from the base station; and,
    forwarding the received reply signals to the mobile device.

16. A method of facilitating two way communications between a mobile device and a base station comprising:
    receiving from the mobile device a shorter range wireless signal at a first intermediate transmission device in a vehicle wherein the first intermediate transmission device receives power from an automobile battery, the first intermediate transmission device deciding whether to authorize transmission of a signal based on the amount of power in the automobile battery, wherein emergency signals enable override of the power protection feature to allow intermediate transmission device to forward emergency signals even though the power level is below a present cut off;
    determining whether the wireless signal is in a group of signals authorized for retransmission;
    retransmitting signals authorized for retransmission to a base station using a longer range signal;
    receiving reply signals from the base station; and,
    forwarding the received reply signals to the mobile device.

17. A cellular network comprising:
   at least one cellular base station;
   at least one mobile device;
   a first intermediate transmission device in a first vehicle, the intermediate transmission device to receive signals from at least one mobile device in a second vehicle and to forward the signals to at least one cellular base station, the mobile repeater unit to receive replies from at least one cellular base station and forward the replies to at least one mobile device; and,
   handing off the forwarding of signals such that a second intermediate transmission device in a third vehicle receives signals from the at least one mobile device and forwards the signals to the at least one cellular base station when signals from the cellular base station at the intermediate transmission device falls below a preset threshold,
   wherein the mobile device selects an intermediate transmission device by determining the relative motion between the mobile device and the intermediate transmission device.

18. The network of claim 17 wherein at least one mobile device is also a cellular device.

19. The network of claim 17 wherein at least one mobile device uses a shorter range communication signal.

20. The network of claim 19 wherein the shorter range communication signal is a WiFi signal.

21. The method of claim 1 further comprising:
   handing off the repeating of the longer range signal from the first intermediate transmission device to the second intermediate transmission device when a signal strength from the first intermediate transmission device at the mobile device falls below a preset threshold.

22. A method of facilitating two way communications between a mobile device in a first vehicle and a base station comprising:
   receiving from the mobile device in the first vehicle a shorter range wireless signal at a first intermediate transmission device in a second vehicle;
   determining whether the wireless signal is in a group of signals authorized for retransmission;
   retransmitting signals authorized for retransmission to a base station using a longer range signal;
   receiving reply signals from the base station;
   forwarding the received reply signals to the mobile device in the first vehicle; and,
   handing off the retransmitting of signals to a second intermediate transmission device in a third vehicle when a signal strength received from the mobile device at the first intermediate transmission device falls below a preset threshold,
   wherein the mobile device selects the intermediate transmission device by determining the relative motion between the mobile device and the intermediate transmission device.

* * * * *